Feb. 27, 1968 S. A. SEYMOUR ETAL 3,370,721
SILO UNLOADER
Filed Aug. 24, 1966 6 Sheets-Sheet 1

INVENTOR.
SHAUN A. SEYMOUR
WILLIAM W. MANN
WILLIAM E. JAMES
DANIEL C. HEITSHU

Walter V. Wright

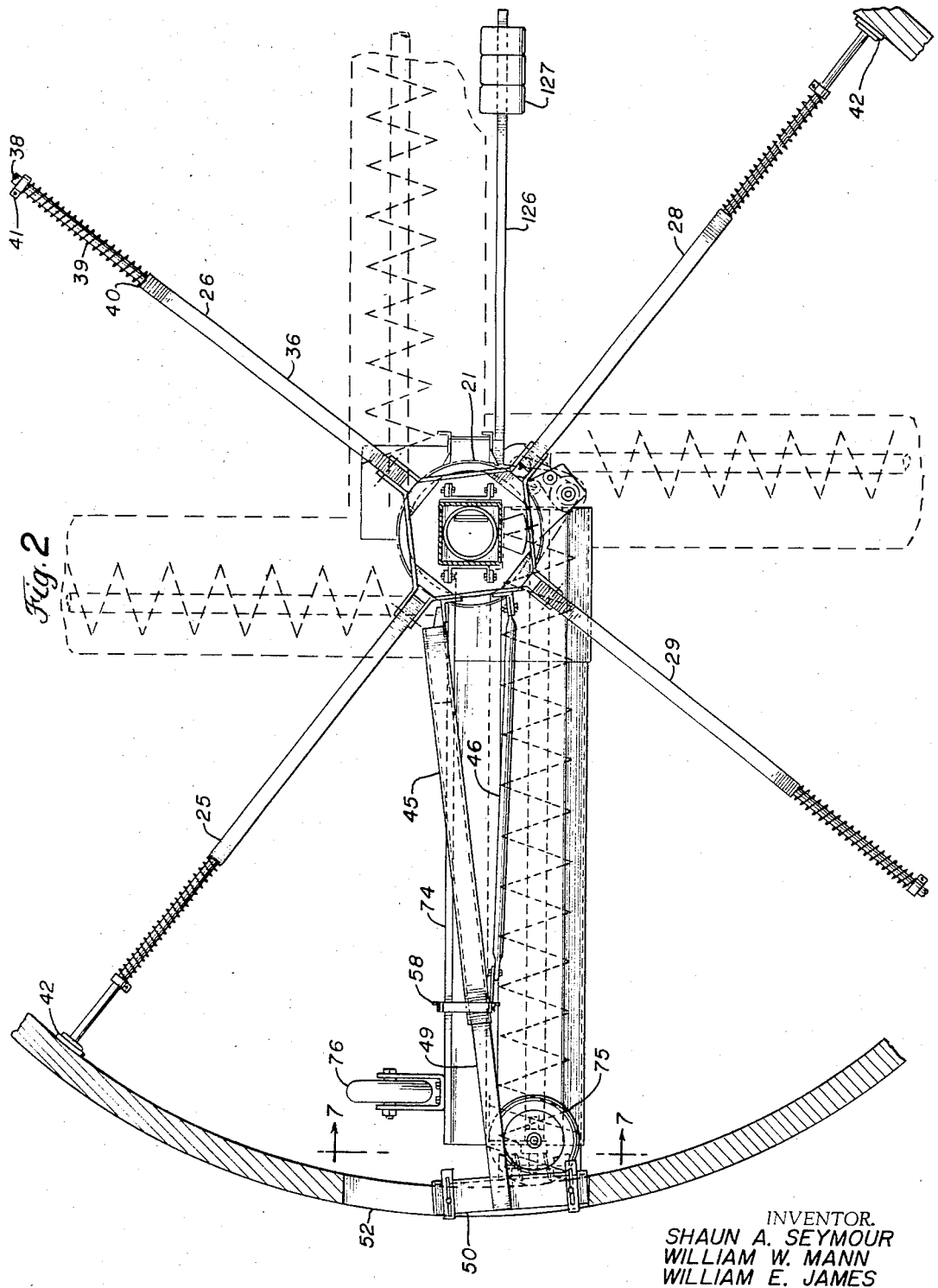

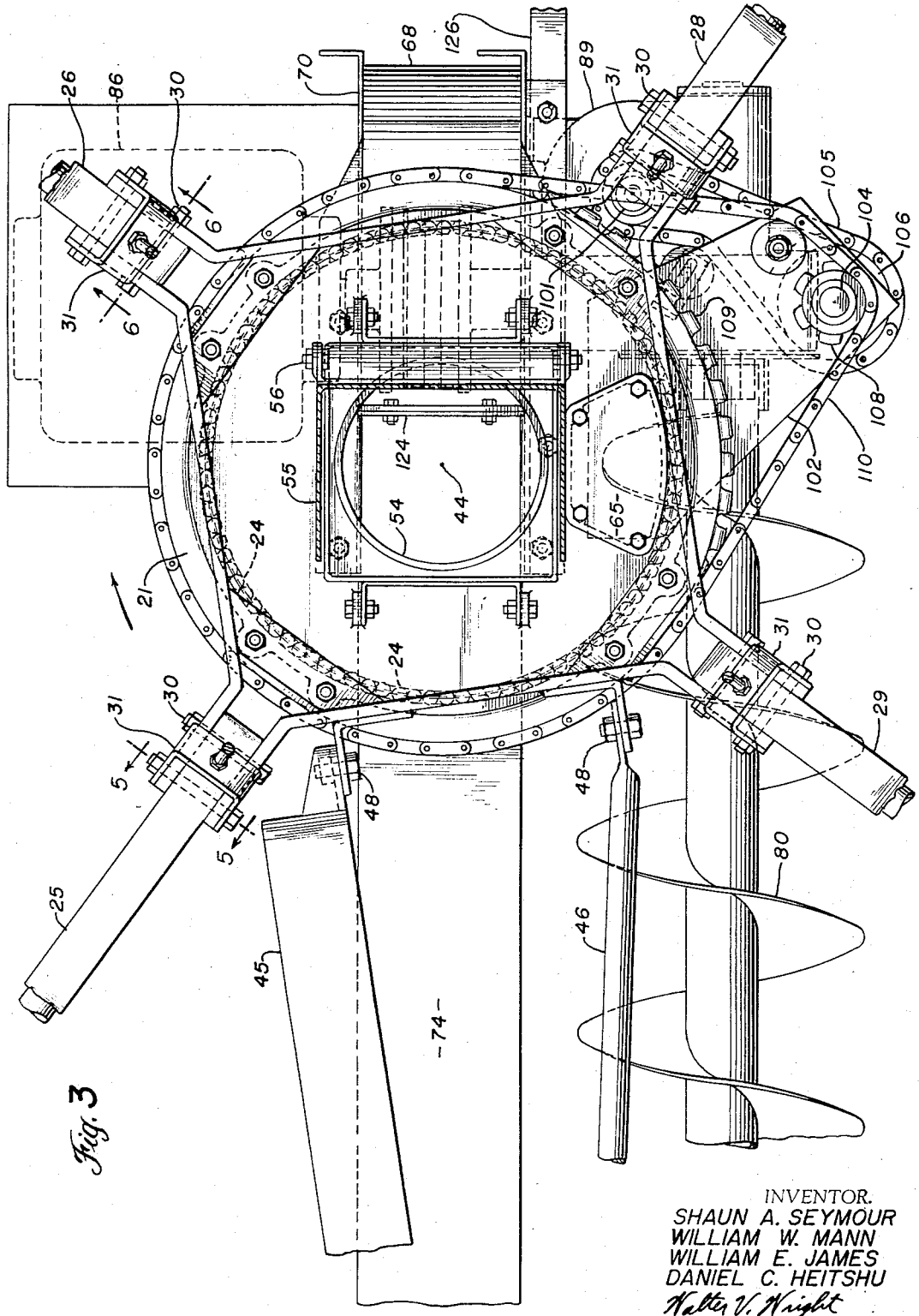

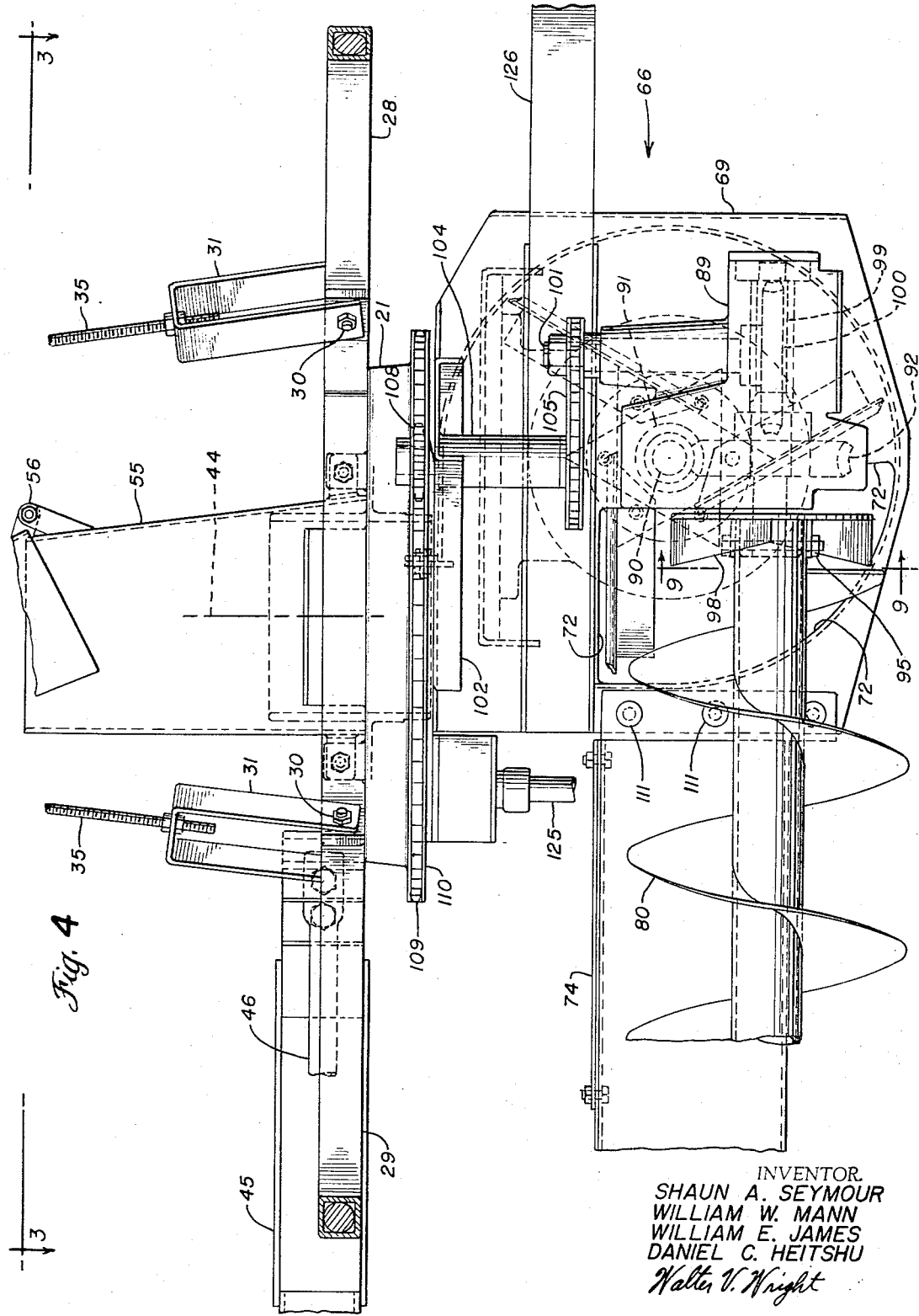

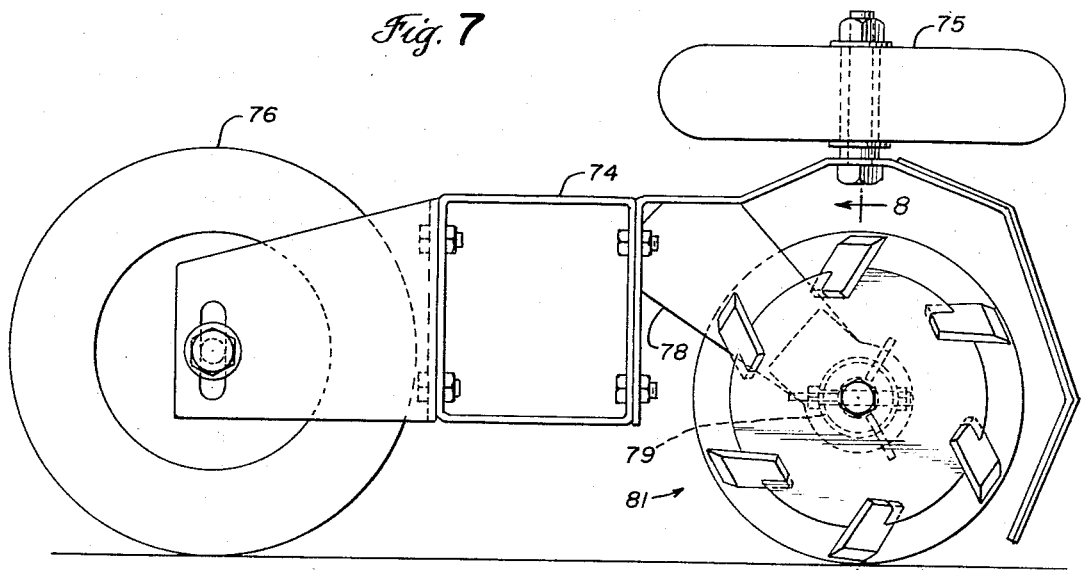
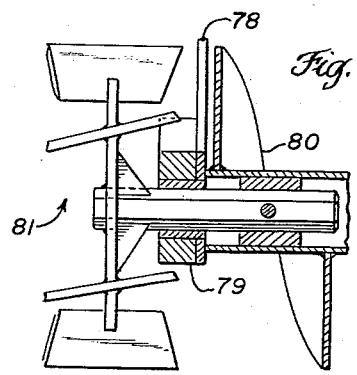
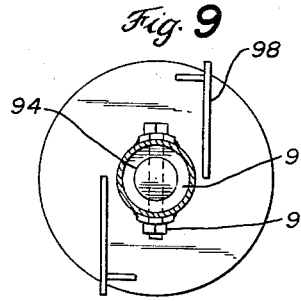
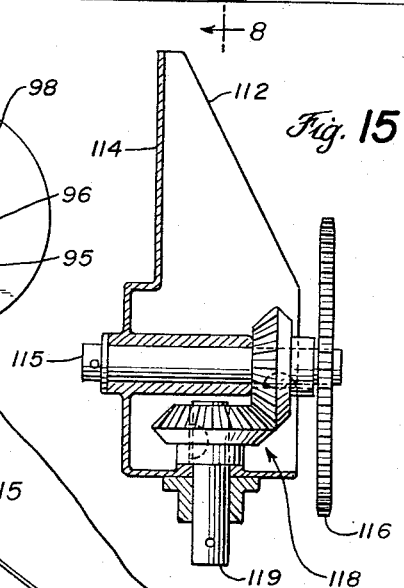
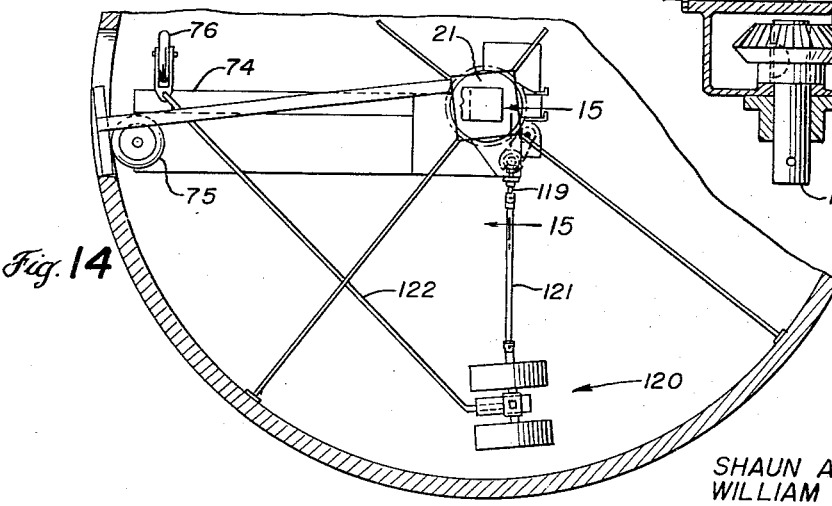

Feb. 27, 1968  S. A. SEYMOUR ET AL  3,370,721
SILO UNLOADER
Filed Aug. 24, 1966  6 Sheets-Sheet 6
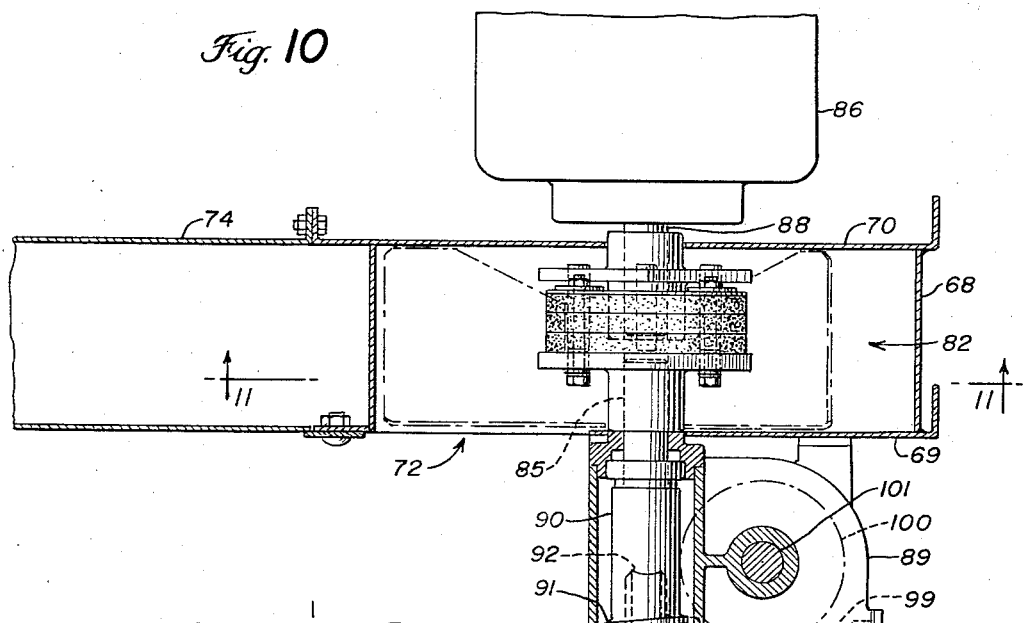
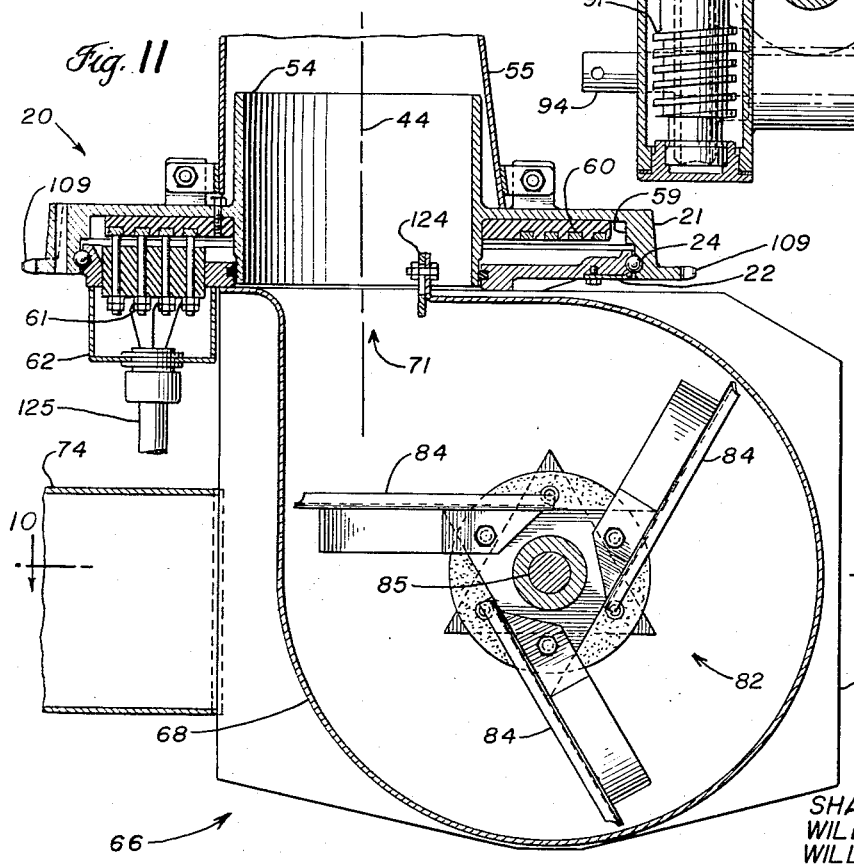
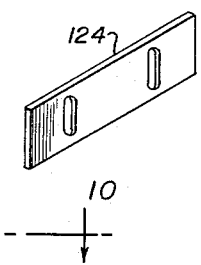
INVENTOR.
SHAUN A. SEYMOUR
WILLIAM W. MANN
WILLIAM E. JAMES
DANIEL C. HEITSHU
Walter V. Wright United States Patent Office 3,370,721
Patented Feb. 27, 1968

3,370,721
SILO UNLOADER
Shaun A. Seymour, Ephrata, and William W. Mann, Talmage, Pa., William E. James, Dijon, France, and Daniel C. Heitshu, Shippensburg, Pa., assignors to Sperry Rand Corporation, New Holland, Pa., a corporation of Delaware
Filed Aug. 24, 1966, Ser. No. 574,604
10 Claims. (Cl. 214—17)

This invention relates generally to silo unloaders. More particularly, it relates to silo unloaders of the type intended to operate on the top surface of material in a silo, as opposed to bottom unloaders which are disposed on the silo floor under the column of silage.

Silo unloaders conventionally include power driven mechanism to gather material from the surface of the silage and deliver it to a predetermined location, power driven mechanism to maneuver the gathering mechanism over the entire surface of the colum of silage and power mechanism to discharge the gathered material from the predetermined location to the exterior of the silo. The above mechanisms are assembled on a frame into a single machine unit. The end result is a complex expensive machine, often with two or more separate motors and gearboxes interconnected by complicated, costly, drive trains and requiring a complex frame structure and associated supporting and leveling mechanisms.

It is an object of this invention to provide a simplified, improved silo unloader.

It is another object of this invention to improve upon the efficiency and coaction of the various operating mechanisms of which a silo unloader is comprised.

It is another object of this invention to improve upon the drives of the various silo unloader mechanisms by eliminating belts and the like and providing direct line closed-coupled drive shafts between the mechanisms.

It is another object of this invention to provide a silo unloader having simplified frame requirements by utilizing an impeller housing as a frame member and balancing other components relative thereto to eliminate the need for outrigger-type leveling wheel systems.

It is another object of this invention to provide a silo unloader having only a single motor and gearbox arranged to readily accommodate either a chain and sprocket traction drive or a silage surface traction wheel drive to propel the gathering auger about the silage surface.

It is another object of this invention to provide a silo unloader design affording rugged construction and high performance at low manufacturing cost through efficient coordination and coaction of a minimum number of mechanically simple, rugged component mechanisms.

These and other objects and advantages of this invention will be apparent upon reference to the following description and claims taken in conjunction with the accompanying drawings wherein:

FIG. 2 is a plan view of the silo unloader with the discharge spout removed;

FIG. 3 is a fragmentary enlarged plan view of the central part of the unloader seen in FIG. 2 and taken on the line 3—3 of FIG. 4;

FIG. 4 is a fragmentary side elevational view of the portion of the unloader shown in FIG. 3;

FIG. 7 is an end view of the gathering auger indicated by the line 7—7 of FIG. 2;

FIG. 8 is a detailed sectional view taken on the line 8—8 of FIG. 7;

FIG. 9 is a sectional view at the inboard end of the gathering auger taken on the line 9—9 of FIG. 4;

FIG. 10 is a fragmentary sectional view taken on the line 10—10 of FIG. 11 and showing the drive connection between the motor, impeller and gearbox;

FIG. 11 is a sectional view taken on the line 11—11 of FIG. 10;

FIG. 12 is a detail view of the discharge passage scraper seen in FIGS. 11 and 3;

FIG. 14 is a semi-diagrammatic view of the unloader showing the surface silage traction wheel embodiment of the gathering auger propelling means; and FIG. 15 is an enlarged detail sectional view of a portion of the drive mechanism shown in FIG. 14 and taken on the line 15—15 of FIG. 14.

Figure 1:
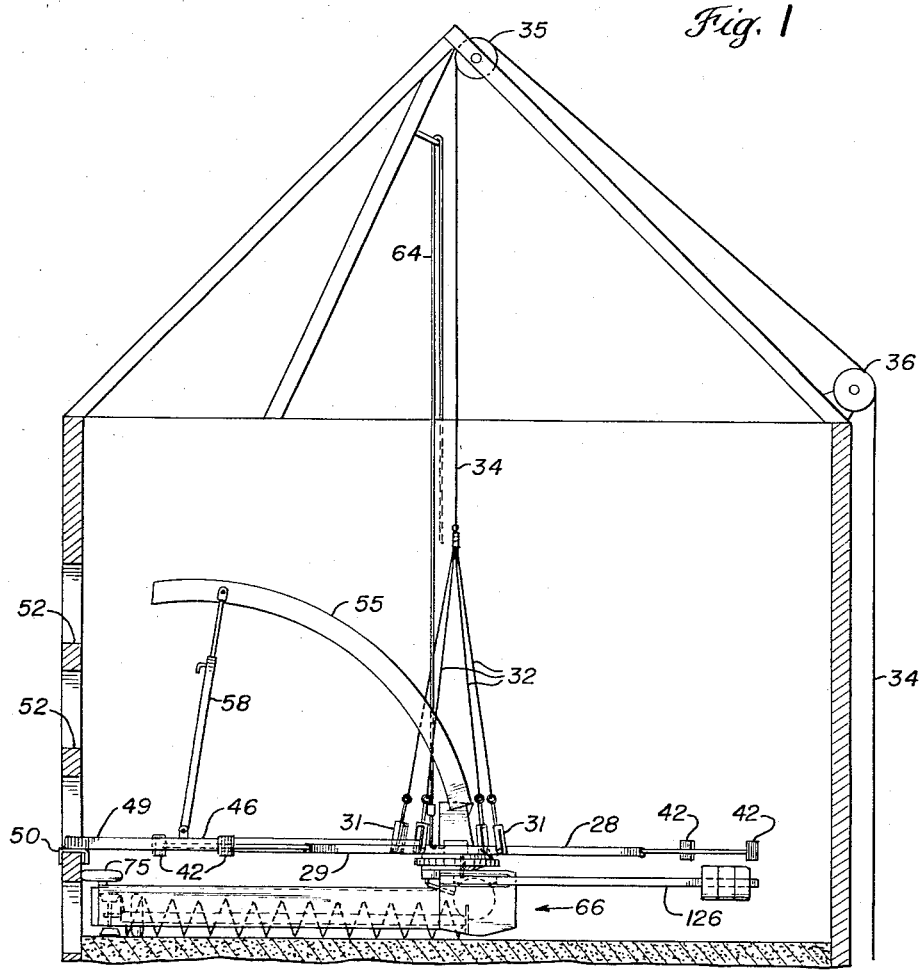
FIG. 1 is a sectional elevational view of the upper portion of a silo showing the silo unloader of the present invention therein semi-diagrammatically.

Referring now to the drawings in detail, the present invention comprises an articulate structure, having two major portions: a first, or fixed, portion which is stationary when the unloader is in operation and a second, or revolvable, portion which rotates relative to the fixed portion when the unloader is operating. The line of division between these two portions may best be understood by first referring to FIG. 11 of the drawings. In FIG. 11 a large diameter journal, indicated generally by the reference numeral 20, is shown in cross section. The upper portion of journal 20, hereafter known as the first journal means, is indicated by the reference numeral 21. The lower half of journal 20, known as the second journal means, is indicated by the reference numeral 22. These two journal means constitute outer and inner bearing races which carry a series of ball bearings indicated by the reference numeral 24 and seen in phantom lines in FIG. 3 as well as in solid lines in FIG. 11.

Referring to FIGS. 1–4, four arms 25, 26, 28, and 29 are fixed to the upper side of first journal means 21 and attached thereto for vertical pivotal movement by pivot bolts 30, four inverted U-shaped suspension cable mounting brackets 31 are also pivotally attached to first journal means 21.

Figures 5, 6:
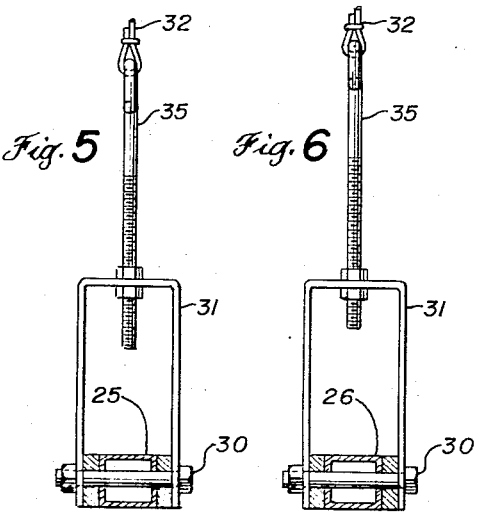
FIGS. 5 and 6 are detailed views of two of the suspension cable mounts.

In FIG. 1 it may be seen that four cables 32 merge upwardly from the brackets 31 to a single main suspension cable 34 which extends around a pair of pulleys 35 and 36 and travels down to the ground to the usual winch anchoring means (not shown). Each of the four cables 32 carries a threaded I-bolts 35 at its lower end. The I-bolts 35 are carried by the cable mounting brackets 31 as illustrated in FIGS. 5 and 6 as well as in FIGS. 3 and 4.

The construction of the four arms 25-29 will be readily understood from FIG. 2 of the drawings. Each arm (see arm 26 in FIG. 2) has a radially inner section 36 of substantially square cross section and a radially outer section 38 telescopically received axially within inner section 36. A coil spring 39 is received over the radially outer section 38 and has a radially inner end 40 abutting the radially outer end of arm section 36. An adjustable clamp, or collar, 41 is tightened about outer arm section 38 and is abutted by the radially outer end of the coil spring 39. Bearing pads 42 (see arms 25 and 28 in FIG. 2 and see also FIG. 1) are carried on the outer most ends of the four arms 25-29. The springs 39 are under compression and bear against stop collars 41 to yieldably urge the bearing pads 42 against the silo wall.

The suspending cables and the telescopic centering arms serve to mount the first journal means 21 in a silo with the axis of rotation 44 (see FIGS. 11 and 3) of the first journal means extending generally vertically and substantially centered in the silo.

A fifth arm assembly comprising a rigid arm 45 (see FIG. 2) and a diagonal brace arm 46 are also rigidly attached to first journal means 21. As may be seen in FIG. 3, the arm assembly 45–46 may pivot vertically relative to first journal means 21 about its mounting bolts 48 although it cannot rotate relative to first journal means 21 about the axis 44 of the journal means. Referring again to FIG. 2, an outer arm section 49 is telescopically received within arm section 45 and extends outwardly to the silo wall. At the outer end of section 49, an adjustable clamp means 50 is provided to attach to the sills (see FIG. 1) of the silo discharge openings 52. The arm assembly 45–50 is commonly referred to as a torque arm. Its purpose is to positively prevent rotation of first journal means 21 about it own axis of rotation 44.

Referring again to FIG. 11, first journal means 21 has integrally formed therewith a circular wall 54 which extends above the rest of the body of first journal means 21 as well as down to the plane of the underside of second journal means 22. Wall 54 defines a vertical passage through the first and second journal means coaxial with the axis of rotation 44. A discharge spout 55 (see FIGS. 1 and 11) is mounted on top of first journal means 21 and extends generally upwardly and radially outwardly from the passage defining wall 54. As may be seen in FIGS. 3 and 4, the spout 55 has a pivot joint 56 thereby enabling its outer end to be raised and lowered as necessary to be directed at one of the silo unloading doors 52. In FIG. 1 it may be seen that the outer end of spout 55 is adjustably supported by an arm 58 from the torque arm 46. The spout supporting arm 58 is also partially visible in FIG. 2.

Referring again to FIG. 11 it may be seen that a downwardly opening annular cavity 59 is provided in first journal means 21 and has the open bottom thereof closed by second journal means 22. An annular series of electrical conductor rings 60 are provided in cavity 59. A series of electricity conducting brushes 61 are carried by second journal means 22 within a cover housing 62 as may be seen in FIG. 11. Electric power to operate the silo unloader is supplied to rings 60 by an electric cable 64 (FIG. 1) from a source of current on the ground. Cable 64 extends from the ground to an electric junction box 65 (see FIG. 3) which includes current connections to the conductor rings 60. These details are conventional and have not been illustrated here beyond the illustration of the junction box 65 in FIG. 3.

Referring again to FIG. 11, an impeller chamber, indicated generally by the reference numeral 66 is fixedly attached to the underside of second journal means 22. Impeller chamber 66 has an outer annular peripheral wall 68 and planar side plates 69 and 70 (see FIG. 10). The annular wall 68 along with side walls 69 and 70 define a vertical discharge opening coaxial with the axis of rotation 44 of journal means 20 as indicated by the arrow 71 in FIG. 11. A generally triangular material inlet opening is provided in wall 69. This inlet opening may be seen in FIG. 4 where its edges are indicated by the reference numerals 72.

Figure 13:
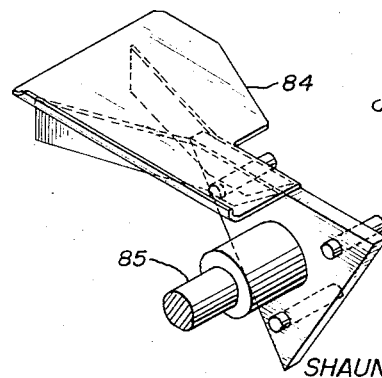
FIG. 13 is an isometric detail of one of the impeller blades.

A hollow frame arm 74 of box cross sectional configuration (see FIG. 7) extends horizontally radially outwardly from the side plates 69 and 70 of impeller housing 66. Referring to FIG. 7, the box frame arm 74 carries at its outer end the usual horizontal thrust reaction wheel 75 which bears against the silo wall. In the embodiment shown, the thrust wheel 75 is actually journalled on the auger housing carried by box arm 74. A vertical support wheel 76 is also journalled on frame arm 74 at the radially outer end thereof. A bracket 78 also depends from the radially outer end of frame arm 74 and provides a journal bearing 79 (see FIG. 8) for the outer end of a material gathering auger. As may be seen in FIG. 8, the usual wall chipper 81 is provided on the axially outer end of the gathering auger 80. Referring again to FIGS. 10 and 11, it may be seen that a rotary impeller 82 having paddles 84, the construction of which is best seen in FIG. 13, is provided inside impeller housing 66. Impeller 82 has a central horizontal shaft 85 journalled in impeller housing side walls 69 and 70. Mounted outside impeller housing wall 70 is an electric motor 86 whose shaft 88 is coaxial and integrated with impeller shaft 85. Mounted outside impeller housing wall 69 is a gearbox 89 whose input shaft 90 is coaxial and integrated with impeller shaft 85.

As best seen in FIGS. 10 and 4, gearbox input shaft 90 has formed thereon a worm 91 which drives a worm wheel 92 fixed on a first gearbox output shaft 94. Output shaft 94 is horizontal and extends at a right angle to gearbox input shaft 90. The first output shaft 94 also extends parallel to box frame arm 74 and terminates in front of the inlet opening 72 of the impeller housing 66. The gathering auger 80, which has been previously described to have its outer end journalled on box arm 74, has its radially inner end attached to first gearbox output shaft 94 by a shear bolt 95 (see FIG. 4) which also extends through the hub 96 (see FIG. 9) of a paddle member 98. Paddle member 98 lies as a sort of crop material barricade at the radially inner end of gathering auger 80. It rotates with the auger, and its paddles propel the material gathered inwardly by auger 80 into the impeller housing 66 through the inlet opening 72.

Referring again to FIGS. 10 and 4, a second worm 99 is provided in gearbox 89 on first output shaft 94. Worm 99 drives a second worm wheel 100 fixed to a vertically extending second gearbox output shaft 101 whose axis is perpendicular to both the gearbox input shaft and the first gearbox output shaft.

Referring now to FIGS. 3 and 4, a gusset-like gear mounting plate 102 is fixedly attached to second journal means 22. A jack shaft 104 is journalled on plate 102 for rotation relative thereto about a vertical axis. A first endless chain 105 is entrained about a sprocket on the upper end of second gearbox output shaft 101 and a sprocket 106 (FIG. 3) carried by the bottom end of jack shaft 104. In this manner jack shaft 104 is driven from second gearbox output shaft 101. A sprocket 108 is fixedly carried by jack shaft 104 at the upper end thereof. In FIG. 11, as well as in FIG. 3, it may be seen that a series of sprocket teeth 109 are formed on the outer perimeter of first journal means 21. As may be seen in FIG. 4, sprocket 108 on the upper end of jack shaft 104 lies in the same horizontal plane as the sprocket teeth 109 on first journal means 21. An endless chain 110 is entrained about the sprocket teeth 109 on first journal means 21 and the small sprocket 108 on the upper end of jack shaft 104. As sprocket 108 rotates about the axis of jack shaft 104 it creeps along chain 110 thereby causing second journal means 22, impeller housings 66, frame arm 74 and all the other mechanisms mounted on these parts to rotate about the axis of rotation 44 defined by the first and second journal means 21 and 22. This occurs because first journal means 21 is fixed against rotation by the torque arm assembly 45.

Silos are constructed in many different diameters. It is customary practice to provide different size silo unloaders for different size silos. The present invention is adaptable for use in silos of all known diameters merely by exchanging the frame arm 74 and auger 80 for the same elements but of diffeernt lengths as required by the diameter of the silo in which the unloader is intended to be used. The auger 80 is readily disconnected at the coupling bolt 95 while the frame arm 74 may be removed from the impeller housing 66 at the bolts 111 shown in FIG. 4. This feature greatly reduces the parts inventory required by dealers to satisfy a wide range of customer demands.

In silos of large diameters, it is sometimes preferred to have traction wheels driving the silo unloader about the rotational axis 44 by direct engagement with the surface of the silage. Such a drive modification is illustrated in FIGS. 14 and 15. The aforementioned gusset-like plate 102 and its jack shaft 104 are removed from the unloader along with drive chain 110. In place of plate 102 the journal plate 112 shown in FIG. 15 is mounted on the underside of second journal means 22. In FIG. 15, the surface of plates 112 indicated by the reference numeral 114 is actually the top horizontal surface when the part is mounted in operating position on the silo unloader. The shaft 115 journalled in member 112 extends vertically with the sprocket 116 lying in the horizontal plane of chain 105 shown in FIG. 4. Chain 105 is entrained about sprocket 116 which through bevel gearing 118 drives a horizontal radially extending stub shaft 119. Shaft 119 may also be seen in FIG. 14. A traction wheel assembly 120 is connected by a drive shaft 121 to the end of shaft 119. A diagonal brace 122 extends from the traction wheel assembly horizontally to the outer end of the previously described frame arm 74 and is anchored thereto. With this embodiment, the second gear-box output shaft 101 drives the traction wheel assembly 120 to propel the gathering arm assembly 44 about the axis 44 of the journal means 20. The advantage of such a drive arrangement is that it locates the actual traction propelling wheels radially outwardly in the silo thereby providing the increased drive leverage sometimes preferred in large diameter silos.

In FIGS. 11 and 12 it may be seen that a rectangular scraper blade 124 (see also FIG. 3) is mounted on impeller housing wall 68 at the impeller discharge opening 71 and extends upwardly into the pasasge defined by circular wall 54. The ends of scraper blade 124 bear on the circular wall 54. As the second journal means 22 and impeller housing 66 rotate about the axis 44 of the journal means, scraper blade 124 prevents the buildup of material on wall 54. The electrical conducting conduit 125 (FIGS. 4 and 11) is of conventional construction and merely conducts electrical power from the brushes 61 to the electric motor 86.

In order to insure even horizontal unloading of material from the surface of the column of silage in a silo, it is important that the silo unloader be substantially balanced relative to the journal means and its axis of rotation. The balance of the present silo unloader is such that it requires no auxiliary supporting wheels beyond the usual gage wheel 76. However, to counterbalance the weight of the gathering arm assembly 74, it is desirable to provide a cantilever arm 126 extending radially outwardly from the impeller housing 66 in the direction diametrically opposite arm 74. A plurality of weights 127 (see FIGS. 1 and 2) are provided on arm 126 and are axially slidable along the arm. Axial adjustment of the weights 127 is employed to compenaste for frame arm and auger assemblies of varying lengths as required by silos of different diameters. The weights 127 may also be moved radially inwardly or outwardly to compensate for soft or hard spots in the column of silage which sometimes result from freezing and other variable conditions to which the silage is normally exposed.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A silo unloader comprising an articulate structure having first and second parts, said first part comprising first journal means defining an axis of rotation, means connected to said first journal means for suspending the journal means from the top of a silo with said axis of rotation extending substantially vertically, a plurality of arms on said first journal means extending radially outwardly in different directions relative to said axis and having outer ends engageable with a silo wall to substantially center said journal means in a silo, means anchoring the outer end of one of said arms to said silo wall to positively prevent rotation of said first journal means about said axis, means defining a vertical passage through said first journal means coaxial with said axis of rotation, a spout mounted on said first journal means and extending upwardly and radially outwardly from said passage defining means, said second part comprising second journal means carried by said first journal means for rotation relative thereto about said axis, an impeller chamber fixed to and depending from said second journal means and having a vertically directed discharge opening coaxial with said axis of rotation and communicating with said passage defining means, a rotary impeller in said chamber and having a central horizontal shaft, a motor disposed along one side of said chamber, and a gearbox disposed along the opposite side of said chamber, said motor having a shaft coaxial and integrated with said impeller shaft, said gearbox having an input shaft coaxial and integrated with said impeller shaft, said gearbox having a first horizontal output shaft, a generally horizontal auger coaxial with said first output shaft and having one end coupled thereto, said impeller chamber having a material inlet opening adjacent said one end of said auger, said gearbox having a second output shaft, and means connected to and driven by said second output shaft to rotate said second part of said articulate structure as a unit relative to said first part about said axis of rotation.

2. A silo unloader, as recited in claim 1, wherein horizontal frame means is fixedly carried by said impeller chamber and extends radially outwardly relative to said axis of rotation along a line perpendicular to said impeller shaft, said auger lying along one side of said frame means and having a radially outer end supported thereon.

3. A silo unloader, as recited in claim 2, wherein said material inlet opening into said impeller chamber is formed in said opposite side thereof between said horizontal frame means and said gearbox, said first output shaft of said gearbox extending perpendicular to said impeller shaft and parallel to said line of extension of said frame means, said one end of said auger terminating adjacent said inlet opening.

4. A silo unloader, as recited in claim 1, wherein said first output shaft of said gearbox extends horizontally perpendicular to said input shaft, said second output shaft of said gearbox extends vertically upwardly therefrom perpendicular to both said gearbox input shaft and said first output shaft, a drive sprocket fixedly carried by said second output shaft, and wherein said means connected to and driven by said second output shaft to rotate said second part of said articulate structure as a unit relative to said first part about said axis of rotation comprises a support fixedly carried by said second part of said articulate structure, a stub shaft journalled on said support, a driven sprocket fixed on said stub shaft, an endless chain entrained about said drive sprocket and said driven sprocket to drive said stub shaft, and traction means operatively connected to said stub shaft and driven thereby to rotate said second journal means relative to said first journal means about said axis of rotation.

5. A silo unloader, as recited in claim 4, wherein said first journal means is provided with an annular series of exterior teeth concentric to said axis of rotation, said traction means comprises a toothed member fixed on said stub shaft, the teeth of said toothed member corresponding in size to the teeth of said annular series of teeth on said first journal means, and an endless chain encircling said first journal means and said toothed member and having links enmeshed with the teeth of both said first journal means and said toothed member.

6. A silo unloader, as recited in claim 4, wherein said traction means comprises at least one traction wheel, means mounting said traction wheel on said second part of said articulate structure for rotation relative thereto about a horizontal axis, and a drive shaft operatively interconnected between said stub shaft and said traction wheel.

7. A silo unloader, as recited in claim 1, wherein said first journal means defines a downwardly opening cavity concentric to said axis of rotation, said second journal means sealing the open bottom of said cavity, a series of electricity conducting rings mounted on said first journal means in said cavity, a plurality of electricity conducting brushes carried by said second journal means and respectively engaging said rings, electric conductor means fixed relative to said second journal means and interconnected between said brushes and said motor, and electric conductor means fixed relative to said first journal means for supplying electric power to said series of rings from a source of electricity exteriorly of said silo.

8. A silo unloader, as recited in claim 1, wherein at least one of said plurality of arms on said first journal means is comprised of a pair of elongated members, one of said elongated members having a portion telescopically received within the other elongated member, a coil compression spring encircling a portion of said one member disposed outside said other member, said spring having a radially inner end abutting the radially outer end of said other elongated member, and an adjustable stop collar clamped about said one elongated member and engaging the radially outer end of said spring whereby said spring biases said one elongated member radially outwardly relative to said other elongated member.

9. A silo unloader, as recited in claim 8, wherein five separate arms are carried by said first journal means, four of said arms being spaced ninety degrees apart relative to each other and being identically constructed in the manner set forth in claim 8, four pressure pads, respectively, mounted on the radially outermost ends of said four arms to bear against the side of a silo wall, the fifth arm carrying at its outer end clamp means fixedly engageable with a silo wall to prevent rotation of said first journal means about said axis of said rotation.

10. A silo unloader, as recited in claim 2, wherein an elongated cantilever arm extends radially outwardly relative to said axis of rotation from said second part of said articulate structure in diametrically the opposite direction from said frame means, and a counterweight carried on said cantilever arm for sliding adjustment thereon to counterbalance the weight of said frame means and auger about said first and second journal means.

References Cited

UNITED STATES PATENTS 3,079,016    2/1963    Dretzke    214—17.84
3,291,325    12/1966    Henningsen et al.    214—17.84

ROBERT G. SHERIDAN, *Primary Examiner.*